Figure 1:
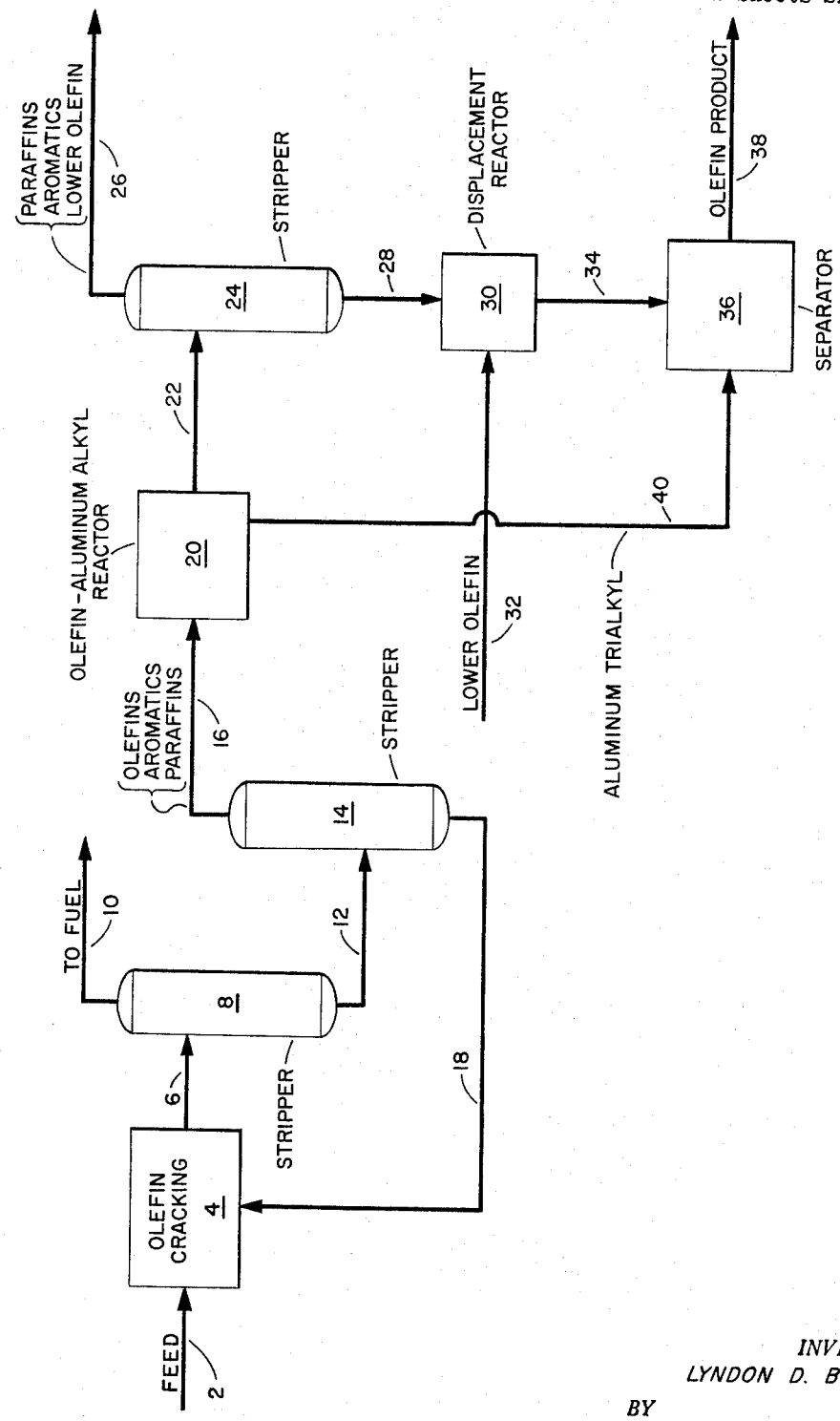

Nov. 15, 1966  L. D. BOYER  3,285,988
PURIFICATION OF OLEFINS
Filed June 17, 1963                        2 Sheets-Sheet 1

INVENTOR.
LYNDON D. BOYER
BY
William A. Mikesell
ATTORNEY

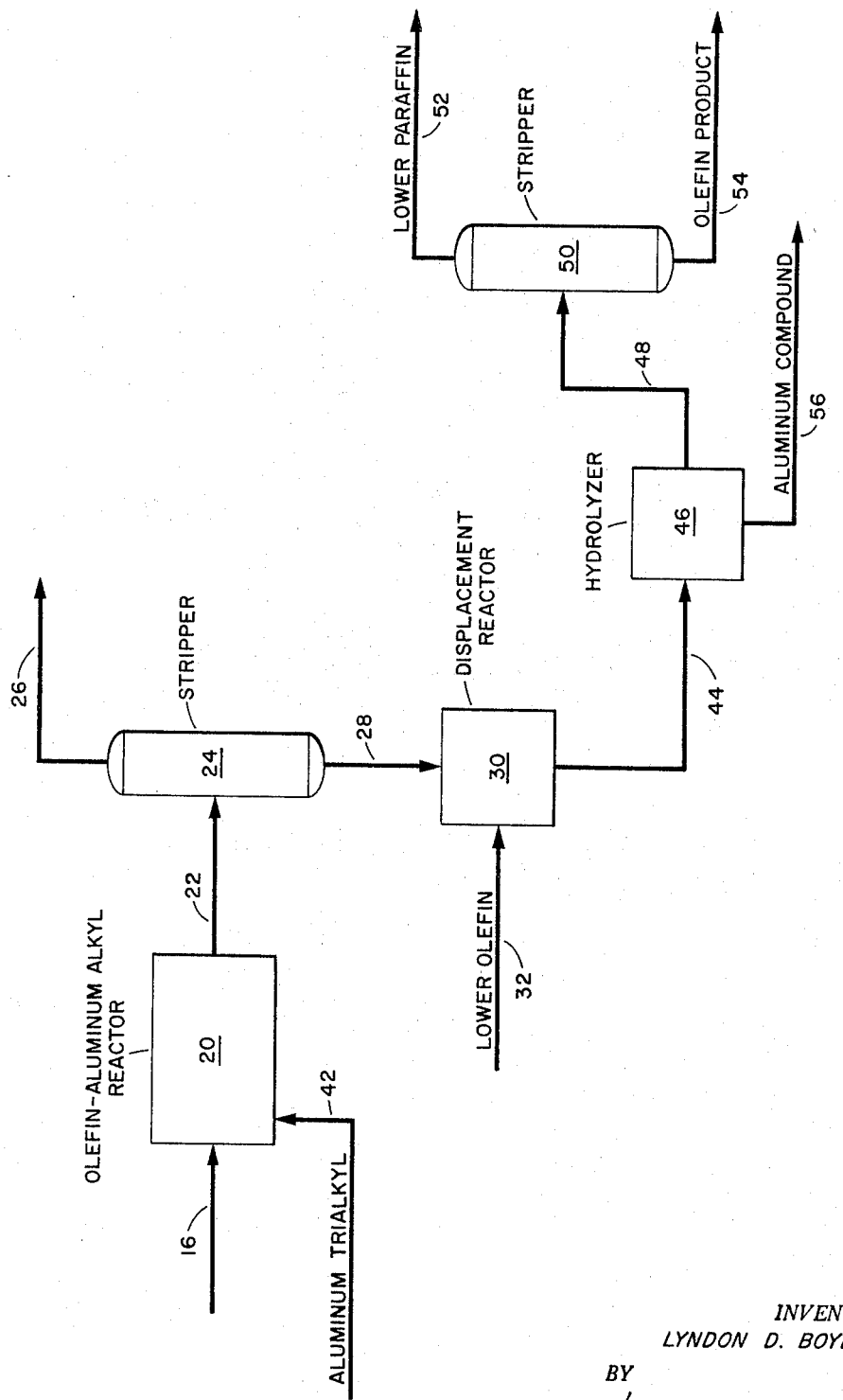

United States Patent Office 3,285,988
Patented Nov. 15, 1966

3,285,988
PURIFICATION OF OLEFINS
Lyndon D. Boyer, Ponca City, Okla., assignor to Continental Oil Company, Ponca City, Okla., a corporation of Oklahoma
Filed June 17, 1963, Ser. No. 288,264
9 Claims. (Cl. 260—677)

This invention relates to purification of an olefin-containing stream. In one aspect, the invention relates to process and apparatus for removing olefins from a stream containing them by forming a compound with an organoaluminum, separating the remainder of the stream, and regenerating the olefins from the compound. In another aspect, the invention relates to process and apparatus for producing a high purity olefin stream by cracking a paraffinic stream, tying up resulting olefins as an organoaluminum compound, separating the remainder of the stream from the compound, and regenerating the compound by displacement to produce olefin product.

Olefins have long been recognized as valuable intermediates for production of plastics as by polymerization or condensation. The recent technical expansion in the plastics field has made olefins of more importance than ever before. In many processes being used today, such as in various polymerization processes, the demand is for high purity olefin streams, that is, streams containing low amounts of such as paraffins, diolefins, acetylenes, and aromatics. Various processes, such as solvent extraction and fractionation have been used to separate olefins from a mixed hydrocarbon stream, but for various reasons, including selectivity and expense, these processes have their disadvantages.

Accordingly, it is an object of this invention to provide process and apparatus for separating olefins from a mixed stream. It is another object of the invention to provide process and apparatus for producing an olefin-containing stream and for separating from the stream a product comprising high purity olefins.

Other aspects, objects, and the several advantages of this invention will become apparent upon study of this disclosure, the appended claims, and the drawing, in which:

FIGURE 1 is a schematic representation of one embodiment of my invention wherein the olefin separating agent is recycled, and FIGURE 2 is a schematic representation of a second embodiment of my invention wherein the olefin separating agent is used on a once-through basis.

According to the invention, there are provided process and apparatus for recovering olefin from a mixed fluid stream containing it which comprises contacting the stream with trialkylaluminum in which at least one alkyl group contains from 2 to 4 carbon atoms under conditions effective to cause displacement of an alkyl group from the trialkylaluminum by olefin, separating the resulting admixture into a first stream comprising organoaluminum and a second stream comprising at least a portion of the remainder of the admixture, contacting the organoaluminum with an alkene of 2 to 4 carbon atoms under conditions effective to displace olefin from the organoaluminum and separating the thus-displaced olefin as a product of the process. There are further provided process and apparatus for producing a high purity olefin product from a paraffinic feed which comprises cracking the feed under conditions of temperature, pressure and residence time effective to produce olefins, passing the cracked feed to a first displacement reactor wherein it is contacted with trialkylaluminum of which at least one alkyl group contains from 2 to 4 carbon atoms under conditions effective to cause displacement of an alkyl group from the trialkylaluminum by olefin, separating the resulting admixture into a first stream comprising organoaluminum and a second stream comprising at least a portion of the remainder of the admixture, contacting the organoaluminum with an alkene of 2 to 4 carbon atoms under conditions effective to displace olefin from the organoaluminum, and separating the thus-displaced olefin as a high purity product of the process.

Referring now to the drawing, and to FIGURE 1 in particular, a feed stream is introduced into the system by way of conduit 2. The feed stream can contain olefins, although it preferably does not, because of subsequent diolefin formation, and can for example comprise a paraffinic raffinate stream or a wax stream. The stream is passed to a cracking zone 4, which can comprise thermal or catalytic cracking in known manner; the zone is preferably operated so as to produce a maximum mono-olefin content. The cracked stream is then passed by way of conduit 6 to stripper 8 where light ends are taken overhead by way of conduit 10, and can be used for example as fuel gas. These light ends will comprise hydrogen, methane, and other light hydrocarbons, and inerts such as nitrogen. Bottoms from stripper 8 are removed by way of conduit 12; this stream comprises paraffins and olefins with minor amounts of aromatics and naphthenes. The stream is separated in stripper 14 to produce a heavy ends stream, which can be recycled by way of conduit 18 for cracking, and an intermediate boiling material which is passed by way of conduit 16 to reaction zone 20. The stream in conduit 16 comprises the raw olefin-containing feed for the separation process. Any diolefins present in this feed can be removed as desired by e.g. an acid wash, selective hydrogenation or solvent extraction, not shown. In zone 20, the stream is reacted with trialkylaluminum according to the reaction (1) 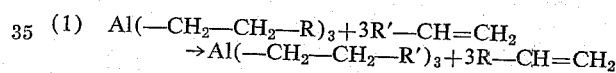

in which R is hydrogen or a lower straight or branched paraffin radical of preferably 4 or less carbon atoms, and R' is a hydrocarbon radical of preferably 4 or more carbon atoms; the R groups can be mixed and can, in fact, include cycloalkyl, but are preferably the same, such as isobutyl, while the R' groups will in the usual instance be mixed. Thus, in zone 20 the olefins in stream 16 are "displaced onto" or tied up as aluminum alkyls. The resulting mixed stream is passed by way of conduit 22 to stripper 24, wherein the non-olefinic portion of stream 16 along with olefins produced by displacement in zone 20 are taken overhead by way of conduit 26. This latter stream can be separated to recover the lower olefins displaced in zone 20, and the separated lower olefins can be subsequently used as feed in conduit 32 as will be explained. The remainder of overhead stream 26 can be used, for example, as a blending or cracking stock. Bottoms from stripper 24 are removed by way of conduit 28, and comprise trialkylaluminum compounds derived from the olefin content of stream 16. These trialkylaluminum compounds are passed to a displacement zone 30, and are reacted therein with lower olefins from conduit 32 according to the reaction (2) 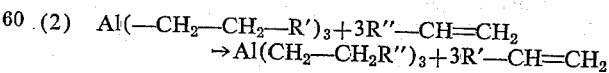

in which R' is as previously described and R" is hydrogen or a lower alkyl group of preferably 4 or less carbon atoms. Olefins for the displacement stream 32 can, if desired, be separated from stream 26 as previously described. The resulting mixed stream is passed by way of conduit 34 to separation zone 36, wherein the displaced olefins are separated as a high purity olefin product stream 38 and a trialkylaluminum stream 40, which is preferably recycled for re-use in forming the higher alkyl compound as shown. Thus there is provided process and apparatus for separating a high purity olefin product from a mixed stream wherein the trialkylaluminum separating agent is recycled for re-use.

Turning now to FIGURE 2, in which like numerals are used for zones corresponding to those of FIGURE 1, the olefin-containing stream in conduit 16 is passed to reaction zone 20, wherein it is contacted with a trialkylaluminum stream introduced by way of conduit 42. The embodiment of FIGURE 2 is "once-through" with regard to the trialkylaluminum, and thus stream 42 is a feed stream. In reactor 20, the olefin content of stream 16 is "tied up" as in FIGURE 1, and the resulting mixed stream is separated in stripper 24. The remaining trialkylaluminum stream is subjected to displacement in zone 30 with a low molecular weight olefin introduced by way of conduit 32, which can again be the result of separation from stream 26, and the mixture of higher molecular weight olefins and lower molecular weight trialkylaluminum from displacement zone 30 is passed by way of conduit 44 to hydrolyzing zone 46. In hydrolysis zone 46, the stream is contacted with a hydrolyzing agent such as water to produce aluminum oxide or an aluminum salt and a low molecular weight paraffin which is derived from the alkyl radicals of the trialkylaluminum. The alumina or aluminum salt can be separated by such as filtration or decantation and is removed by way of conduit 56, and can be used as a high purity alumina product. The mixture of lower paraffin and product olefins is passed by way of conduit 48 to stripper 50, wherein the low molecular weight paraffin is taken overhead by way of conduit 52, and the high purity olefin product is removed by way of conduit 54.

The invention will now be illustrated by the following specific examples.

Example 1

A paraffinic raffinate of about 35° API, 440 average molecular weight, C/H ratio of 6, aromatic content of <1 weight percent (remainder paraffins and naphthenes), ASTM boiling range of about 500 to 900° F. and 50% B.P. of 800° F. is passed by way of conduit 2 of FIGURE 1 at a rate of 23,840 #/hr. Cracking zone 4 is operated at 1000° F. and 45 p.s.i.a. The cracked product in conduit 6 comprises about 16 weight percent olefins and the remainder essentially paraffins and naphtenes, and is produced at a rate of about 100,000 #/hr. Stripper 8 is operated at about 150° F. and 17 p.s.i.a. Feed to stripper 14 (in conduit 12) comprises about 14 weight percent olefins, with the remainder essentially paraffins and naphthenes, at a rate of about 92,270 #/hr. Stripper 14 is operated at about 170° F. at the top, 500° F. at the bottom, and 17 p.s.i.a. Stripper overhead in conduit 16 is about 65 weight percent olefins with the remainder essentially paraffins and naphthenes at a rate of about 15,750 #/hr. Triisobutylaluminum is passed to reactor 20 by way of conduit 40 at about 4,750 #/hr. Reactor 20 is operated at about 225° F. and 25 p.s.i.a., and its effluent in conduit 22 comprises about 55 weight percent trialkylaluminum, 18 weight percent isobutene, and 27 weight percent paraffins and other at a total rate of about 20,500 #/hr. Stripper 24 is operated at about 250° F. and slightly below 1 p.s.i.a. Stripper bottoms in conduit 28 comprise 99+ weight percent trialkylaluminum with a trace of other components at a total rate of about 11,300 #/hr., and displacement isobutene is fed to reactor 30 at a rate of about 4000 #/hr. Reactor 30 is operated at about 550° F. and 165 p.s.i.a., and its effluent in conduit 34 comprises about 67 weight percent olefins and 33 weight percent aluminum triisobutyl, with a trace of other components, at a total rate of about 15,300 #/hr. Separator 36 is operated at about 150° F. and 25 p.s.i.a. Olefin product is produced by way of conduit 38 at a rate of about 10,000 #/hr., and comprises a high purity olefin mixture.

Example 2

The system of FIGURE 2 is operated in a manner similar to that of FIGURE 1, such that the stream in conduit 44 comprises about 67 weight percent olefin and 33 weight percent aluminum triisobutyl with a trace of other components at a total rate of about 15,300 #/hr. Hydrolyzer 46 is operated at about 80° F. and one atmosphere. There is produced by way of conduit 50 about 1850 #/hr. aluminum hydroxide on a water-free basis. Stripper 50 is operated at a top temperature of about 120° F., a bottom temperature of about 400° F., and a pressure of about 100 p.s.i.a. Isobutane of 99+ weight percent purity is produced at a rate of about 4140 #/hr. by way of conduit 52, and high purity olefin product is removed by way of conduit 54 at a rate of about 10,000 #/hr.

Example 3

A commercially available olefin mixture, known as Shell 810 olefins, has the following properties: total olefin content, 90 weight percent; aromatics, 7 weight percent; and paraffins, 3 weight percent. These properties were determined by FIA analysis. The mixture, by Engler distillation, had a 5% point of 265° F. and a 95% point of 317° F. The mixture was further analyzed by GLPC and IR, and determined to have the following properties: straight chain $C_8$ olefin, 19 wt. percent; straight chain $C_9$ olefin, 28 wt. percent; straight chain $C_{10}$ olefin, 14 wt. percent; and aggregate branch chain olefin, diolefin, paraffin and aromatic, 39 wt. percent. The average molecular weight of the straight chain olefin portion was 124, and the mixture had an estimated terminal-to-internal olefin ratio of 18. Portions of this mixture were reacted with aluminum triisobutyl at 100–110° C. in three runs as follows:

| Run No. | Grams Hydrocarbon | Grams straight chain olefin (61 weight percent) | Equivalents straight chain olefin (Mol. wt. 124) | Equivalents Al-C bond added as aluminum triisobutyl | Theoretical liters isobutene evolved (limited by straight chain olefin) | Actual liters Isobutene evolved | Percent straight chain olefin recovered with aluminum | Hours contact |
|---|---|---|---|---|---|---|---|---|
| A | 81 | 49.5 | 0.40 | 0.51 | 8.96 | 8.6 | 96.0 | 8–10 |
| B | 160 | 97.7 | 0.79 | 1.0 | 17.74 | 19 | [1] 107 | 12 |
| C | 195 | 119 | 0.96 | 1.0 | 21.4 | 12 | [2] 56.1 | 6 |
| Theoretical | 203 | 124 | 1.0 | 1.0 | 22.4 | 22.4 | 100.0 | |

[1] Aluminum triisobutyl apparently tied up some of the branched chain olefins.
[2] Insufficient contact time.

The source of the raw olefin-containing stream in conduit 16 has been indicated as being from a cracking operation; of course, any olefin-containing stream can be treated by the process and apparatus of this invention to recover its olefin content as a high purity product.

The reaction in zone 20, whereby olefins in the raw feed displace lower alkyl groups of a lower-alkyl aluminum, is preferably effected at a temperature in the range of about 50 to 300° F. and a pressure sufficient to maintain liquid phase, usually at least atmospheric pressure; high pressures favor the reaction. Reaction times of at least about 15 minutes, and preferably at least about a half hour, are used. No solvent is normally required because of the other components (paraffins, etc.) present. An inert atmosphere can be maintained, although the process stream usually suffices.

The displacement reaction in zone 30 is usually carried out by heating the high molecular weight aluminum alkyl with a lower olefin in the presence of a so-called reduction catalyst, such as nickel, cobalt, palladium, and certain iron compounds. A preferred catalyst is nickel or a nickel compound, and a second choice catalyst is cobalt. Specific nickel catalysts include finely divided metallic nickel, Raney nickel, nickel acetylacetonate, nickel naphthenate, etc. The amount of catalyst used can be varied greatly. When the preferred catalyst is employed, the amount used can vary from about 0.001 to 0.1 percent based on the weight of the alkylaluminum compound present. Suitable temperatures vary from about 100 to about 300° F., preferably from about 190 to about 250° F. The reaction proceeds rapidly, and can take place in less than one minute depending on temperature. Usually a reaction time of about one to thirty minutes is preferred, although longer reaction times can be used. Again, an inert atmosphere, such as nitrogen, helium, argon or krypton can be maintained as in zone 20, if desired, although the process stream again usually suffices. Although the displacement in zone 30 has been indicated as being catalytic, it is also within the scope of this invention to effect this displacement in other manners.

The displacement reaction can be effected in the absence of catalyst by the atomization technique. In such a method, the feed is atomized through well-known means as it is introduced into the displacement reaction zone. The temperature is maintained below about 370° C., more usually between about 40° C. and about 370° C., preferably between about 200° C. and about 290° C. The reaction pressure is maintained below about 200 p.s.i.a. and can be in the subatmospheric range, for example, as low as 1 p.s.i.a. Preferably, the pressure of the reaction varies between about 20 and about 100 p.s.i.a. The time of the reaction can be from about 30 seconds to about 15 minutes, more usually about 1 minute to about 10 minutes, and preferably from about 3 minutes to about 7 minutes. With regard to the means of spraying the aluminum alkyls, various techniques can be employed. For example, the conventional hollow cone nozzles can be employed and atomization is obtained by maintaining a pressure differential across the nozzle. In some instances, the atomization of aluminum alkyl is aided by the use of an atomizing gas, which for the purpose of the present invention can be the alkylene, which is employed in the displacement reaction. Introducing the aluminum alkyls at an elevated temperature is desirable because of the reduction in viscosity. In general, the aluminum alkyls are preheated to a temperature below the reaction temperature, for example, up to about 350° C. Prior to atomization, preheating of the aluminum alkyls is preferably carried out to provide a temperature of about 90° C to 160° C. In a noncatalytic operation where the feed to the displacement reaction is not atomized, it is preferred to employ a temperature of about 200° C. to 320° C. for the displacement reaction. The displacement reaction is then preferably conducted at a pressure of about 150 to 300 p.s.i.g., and the time of reaction can vary from about 0.1 to 10 seconds.

Hydrolysis in zone 46 is effected by adding water to the trialkylaluminum, usually with a minor amount of an added acid or base. Room temperature and pressure are sufficient, although heating speeds the hydrolysis; pressure should be sufficient to maintain liquid phase. When acid or base are added, a corresponding amount of the aluminum salt will be formed in addition to the hydrated alumina.

Suitable aluminum alkyls added by way of conduit 40 or 42 to tie up desired olefin product include the hydrocarbon substituted aluminum compounds wherein each substituent is of about six or less carbons, such as diethylcyclohexylaluminum, triisobutylaluminum, and tri-n-propylaluminum. It is most preferred that all substituents be the same, and that the corresponding olefin be used in conduit 32 for the displacement reaction, especially in the case of recycle as in FIGURE 1. However, any alpha-olefin of about six or less carbon atoms, more preferably 2 to 4 carbon atoms, can be used. Included are ethylene, propylene, n- and i-butylene, and the various pentene and hexene isomers.

It is also preferred that the raw olefin-containing stream, e.g. conduit 16, be adjusted to contain no olefins lower than about six carbon atoms in order for the reaction in zone 20 to be effective. Such adjustment can, for example, be accomplished by choosing the operating conditions of strippers 8 and 14, and even by the severity of cracking in zone 4.

If it is desired to produce a high purity stream of 1-alkanols rather than the olefins as product, this can be effected by oxidizing the higher-alkyl aluminum product of reaction (2), followed by hydrolysis as in zone 46. Further details of such oxidation and hydrolysis are set forth in U.S. Patent 3,053,905 by Coyne et al., issued September 11, 1962.

Having thus described the invention by providing specific examples thereof, it is to be understood that no undue limitations or restrictions are to be drawn by reason thereof and that many variations and modifications are within the scope of the invention.

What is claimed is:

1. A process for recovering α olefin of at least 6 carbon atoms from a mixed fluid stream containing it which comprises:
   (a) contacting said stream with trialkylaluminum in which at least one alkyl group contains from 2 to 4 carbon atoms under conditions effective to cause displacement of an alkyl group from said trialkylaluminum by olefin,
   (b) separating the resulting admixture into a first stream comprising organoaluminum and a second stream comprising at least a portion of the remainder of said admixture,
   (c) contacting said organoaluminum with an alkene of 2 to 4 carbon atoms under conditions effective to displace olefin from said organoaluminum, and
   (d) separating the thus-displaced olefin as a product of the process.

2. The process of claim 1 wherein said trialkylaluminum comprises triisobutylaluminum and said alkene comprises isobutylene.

3. The process of claim 1 wherein the trialkylaluminum formed by the displacing of step (c) is returned, after the separating of step (d), to the contacting of step (a).

4. The process of claim 1 wherein the trialkylaluminum formed by the displacing of step (c) is hydrolyzed prior to the separating of step (d) and wherein the separating of step (d) produces, in addition to an olefin product, an aluminum salt product.

5. A process for producing a high purity α olefin of at least 6 carbon atoms from a paraffinic feed which comprises
   (a) cracking said feed under conditions of temperature, pressure and residence time effective to produce said α olefins.
   (b) passing the cracked feed to a first displacement reactor wherein it is contacted with trialkylaluminum of which at least one alkyl group contains from 2 to 4 carbon atoms under conditions effective to cause displacement of an alkyl group from said trialkylaluminum by said α olefin product,
   (c) separating the resulting admixture into a first stream comprising organoaluminum and a second stream comprising at least a portion of the remainder of said admixture,
   (d) contacting said organoaluminum with an alkene of 2 to 4 carbon atoms under conditions effective to displace α olefin from said organoaluminum, and
   (e) separating the thus-displaced α olefin as a high purity product of the process.

6. The process of claim 5 wherein said trialkylaluminum comprises triethylaluminum and said alkene comprises ethylene.

7. The process of claim 6 wherein triethylaluminum formed by the displacing of step (d) is returned, after the separating of step (e), to the contacting of step (b).

8. The process of claim 5 wherein said trialkylaluminum comprises a tripropylaluminum and said alkene comprises propylene.

9. The process of claim 8 wherein the tripropylaluminum formed by the displacing of step (d) is oxidized and hydrolyzed whereby there is produced, in addition to the olefin product, a propanol product.

References Cited by the Examiner

UNITED STATES PATENTS

| | | | |
|---|---|---|---|
| 2,962,513 | 11/1960 | Meiners | 260—448 |
| 2,987,535 | 6/1961 | Mirviss | 260—448 |
| 3,014,941 | 12/1961 | Walsh | 260—448 |
| 3,035,105 | 5/1962 | Hoffmann | 260—683.15 |
| 3,180,881 | 4/1965 | Zosel | 260—683.15 |
| 3,210,435 | 10/1965 | Kennedy et al. | 260—677 |

ALPHONSO D. SULLIVAN, *Primary Examiner.*